(12) United States Patent
Lee et al.

(10) Patent No.: US 10,404,315 B2
(45) Date of Patent: Sep. 3, 2019

(54) METHOD AND APPARATUS FOR PERFORMING SELF-INTERFERENCE CANCELLATION IN FDR MODE

(71) Applicant: LG ELECTRONICS INC., Seoul (KR)

(72) Inventors: Sangrim Lee, Seoul (KR); Dongkyu Kim, Seoul (KR); Hyunsoo Ko, Seoul (KR); Kwangseok Noh, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

(21) Appl. No.: 15/244,695

(22) Filed: Aug. 23, 2016

(65) Prior Publication Data

US 2017/0063428 A1    Mar. 2, 2017

Related U.S. Application Data

(60) Provisional application No. 62/209,855, filed on Aug. 25, 2015.

(51) Int. Cl.
*H04B 1/525* (2015.01)
*H04L 5/14* (2006.01)
*H04B 1/48* (2006.01)

(52) U.S. Cl.
CPC ............. *H04B 1/525* (2013.01); *H04B 1/48* (2013.01); *H04L 5/1461* (2013.01); *H04B 2001/485* (2013.01)

(58) Field of Classification Search
CPC .... H04B 1/48; H04B 1/525; H04B 2001/485; H04L 5/1461; H04W 52/146; H04W 52/243; H04W 52/325; H04W 52/362
See application file for complete search history.

(56) References Cited

U.S. PATENT DOCUMENTS

| 9,602,157 | B2 * | 3/2017 | Eltawil | H04B 1/123 |
| 2002/0172297 | A1 * | 11/2002 | Ouchi | H04L 27/2647 375/316 |
| 2009/0075612 | A1 * | 3/2009 | Keehr | H03D 7/14 455/226.1 |
| 2012/0201153 | A1 * | 8/2012 | Bharadia | H04B 1/525 370/252 |
| 2013/0301487 | A1 * | 11/2013 | Khandani | H04W 16/14 370/278 |

(Continued)

OTHER PUBLICATIONS

Dani et al "Advanced Self-inerference Cancellation and Multiantenna Techniques for Full-Duplex Radios", IEEE, Year (2013).*

*Primary Examiner* — Khaled M Kassim
(74) *Attorney, Agent, or Firm* — Lee, Hong, Degerman, Kang & Waimey

(57) ABSTRACT

A method for performing self-interference cancellation (SIC) by an apparatus of a full duplex radio (FDR) mode in a wireless communication system including: performing a channel estimation of a received self-interference reference signal; calculating a power value of two order components of a non-linear self-interference signal based on the channel estimation; and establishing a non-linear digital self-interference cancellation order to be considered in the self-interference cancellation based on the power value of each for the two order components.

16 Claims, 10 Drawing Sheets

(56) References Cited

U.S. PATENT DOCUMENTS

| | | | |
|---|---|---|---|
| 2014/0099908 A1* | 4/2014 | Bornazyan | H04B 1/1036 |
| | | | 455/303 |
| 2014/0348018 A1* | 11/2014 | Bharadia | H04L 5/1461 |
| | | | 370/252 |
| 2015/0043323 A1* | 2/2015 | Choi | H04L 5/143 |
| | | | 370/203 |
| 2016/0285486 A1* | 9/2016 | Qin | H04B 1/1027 |
| 2017/0005773 A1* | 1/2017 | Liu | H04B 1/525 |
| 2017/0041060 A1* | 2/2017 | Kim | H04B 15/02 |
| 2017/0041121 A1* | 2/2017 | Noh | H04W 52/325 |
| 2017/0054472 A1* | 2/2017 | Zhang | H04B 3/238 |
| 2017/0187513 A9* | 6/2017 | Bharadia | H04L 5/1461 |
| 2017/0339569 A1* | 11/2017 | Khandani | H04W 12/04 |
| 2018/0026773 A1* | 1/2018 | Kim | H04L 5/14 |

* cited by examiner

METHOD AND APPARATUS FOR PERFORMING SELF-INTERFERENCE CANCELLATION IN FDR MODE

Pursuant to U.S.C. § 119(e), this application claims the benefit of U.S. Provisional Application No. 62/209,855, filed on Aug. 25, 2015, the contents of which are all hereby incorporated by reference herein in their entirety.

BACKGROUND OF THE INVENTION

Field of the Invention

The present invention relates to wireless communication, and more particularly to a method and apparatus for performing self-interference cancellation (SIC or self-IC) in a full duplex radio (FDR) environment.

Discussion of the Related Art

Full duplex communication (FDR) technology can simultaneously perform transmission (Tx) and reception (Rx) at one node, such that system capacity of the FDR technology may be theoretically double that of legacy half duplex communication (HDC) technology in which time or frequency resources are divisionally used to be orthogonal to each other.

FIG. 1 is a conceptual diagram illustrating a user equipment (UE) and a base station (BS) configured to support FDR technology.

A total of three types of interferences may occur in the FDR situation shown in FIG. 1, and a detailed description thereof will hereinafter be given.

Intra-device Self-interference

First interference is intra-device self-interference. During the intra-device self-interference, data transmission/reception (Tx/Rx) is performed using the same time and frequency resources, such that not only a desired signal but also the transmitted signals are simultaneously received. In this case, the transmitted signals are received by a reception (Rx) antenna while attenuation is barely caused, and thus, are received with higher power than a desired signal.

UE to UE Inter-link Interference

Second interference is UE to UE inter-link interference. The UE to UE inter-link interference refers to interference caused by uplink signals that are transmitted from a UE and received by an adjacently positioned UE.

BS to BS Inter-link Interference

Third interference is BS to BS inter-link interference. The BS to BS inter-link interference refers to interference caused by signals that are transmitted between BSs or heterogeneous BSs (picocell, femtocell, and relay node) in a HetNet state and received by an Rx antenna of another BS.

Among the three types of interferences, the intra-device self-interference (hereinafter referred to as self-interference (SI)) is interference caused only in FDR, and may greatly deteriorate performance of the FDR system. In order to manage FDR, a most serious problem is cancellation of self-interference (SI). However, methods for effectively cancelling self-interference in an FDR state have not been discussed in detail.

SUMMARY OF THE INVENTION

Accordingly, the present invention is directed to a method and apparatus for performing self-interference cancellation (SIC) in a full duplex radio (FDR) environment that substantially obviates one or more problems due to limitations and disadvantages of the related art.

An object of the present invention is to provide a method for allowing an FDR-based device to perform self-interference cancellation (SIC) in a wireless communication system.

Another object of the present invention is to provide an apparatus for performing self-interference cancellation (SIC) in an FDR environment.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for performing self-interference cancellation (SIC) by an apparatus of a full duplex radio (FDR) mode in a wireless communication system including: performing a channel estimation of a received self-interference reference signal; calculating a power value for each of two order components of a non-linear self-interference signal based on the channel estimation; and establishing a non-linear digital self-interference cancellation order to be considered in the self-interference cancellation based on the power value for each of the two order components. The method may further include: if the power value of a lower order from among the two orders is higher than that of a higher order by a predefined value, establishing the non-linear self-interference cancellation order to be considered in the self-interference cancellation as the two orders. The method may further include: if the power value of a lower order from among the two orders is equal to or less than that of a higher order by a predefined value by, performing channel estimation of an order increased by 2 as compared to the higher order; and calculating a power value of the order increased by 2 based on a result of the channel estimation applied to the order increased by 2. The order may include only an odd-order. The two orders may include a first order and a third order. The power value for each of the two order components may be calculated based on a predefined multiple-delay channel length, a channel estimation value for each order, a channel estimation value for each delay, and a channel estimation value for each tap. The method may further include: performing the self-interference cancellation using a channel coefficient estimated for the established order.

In accordance with another aspect of the present invention, an apparatus for performing self-interference cancellation (SIC) in a full duplex radio (FDR) mode includes: a processor configured to perform a channel estimation of a received self-interference reference signal, to calculate a power value for each of two order components of a non-linear self-interference signal based on the channel estimation, and to establish a non-linear digital self-interference cancellation order to be considered in the self-interference cancellation based on the power value for each of the two order components. If the power value of a lower order from among the two orders is higher than that of a higher order by a predefined value, the processor may be configured to establish the non-linear self-interference cancellation order to be considered in the self-interference cancellation as the two orders. If the power value of a lower order from among the two orders is equal to or less than that of a higher order by a predefined value, the processor may be configured to perform a channel estimation of an order increased by 2 as compared to the higher order, and calculate a power value of the order increased by 2 based on a result of the channel estimation applied to the order increased by 2. The order may include only an odd-order. The two orders may include a first order and a third order. The processor may be configured to calculate the power value for each of the two order components based on a predefined multiple-delay channel length, a channel estimation value for each order, a channel estimation value for each delay, and a channel estimation value for each tap. The processor may be configured to perform the self-interference cancellation using a channel coefficient estimated for the established order.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Figure 1:
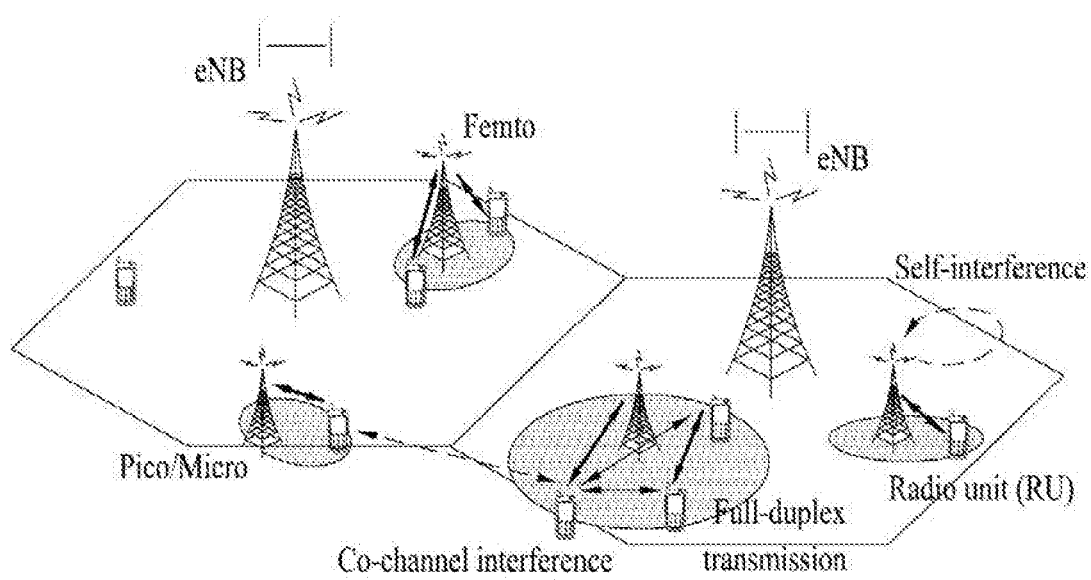
FIG. 1 is a conceptual diagram illustrating a network supporting full-duplex/half-duplex communication operations of a user equipment (UE) according to the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
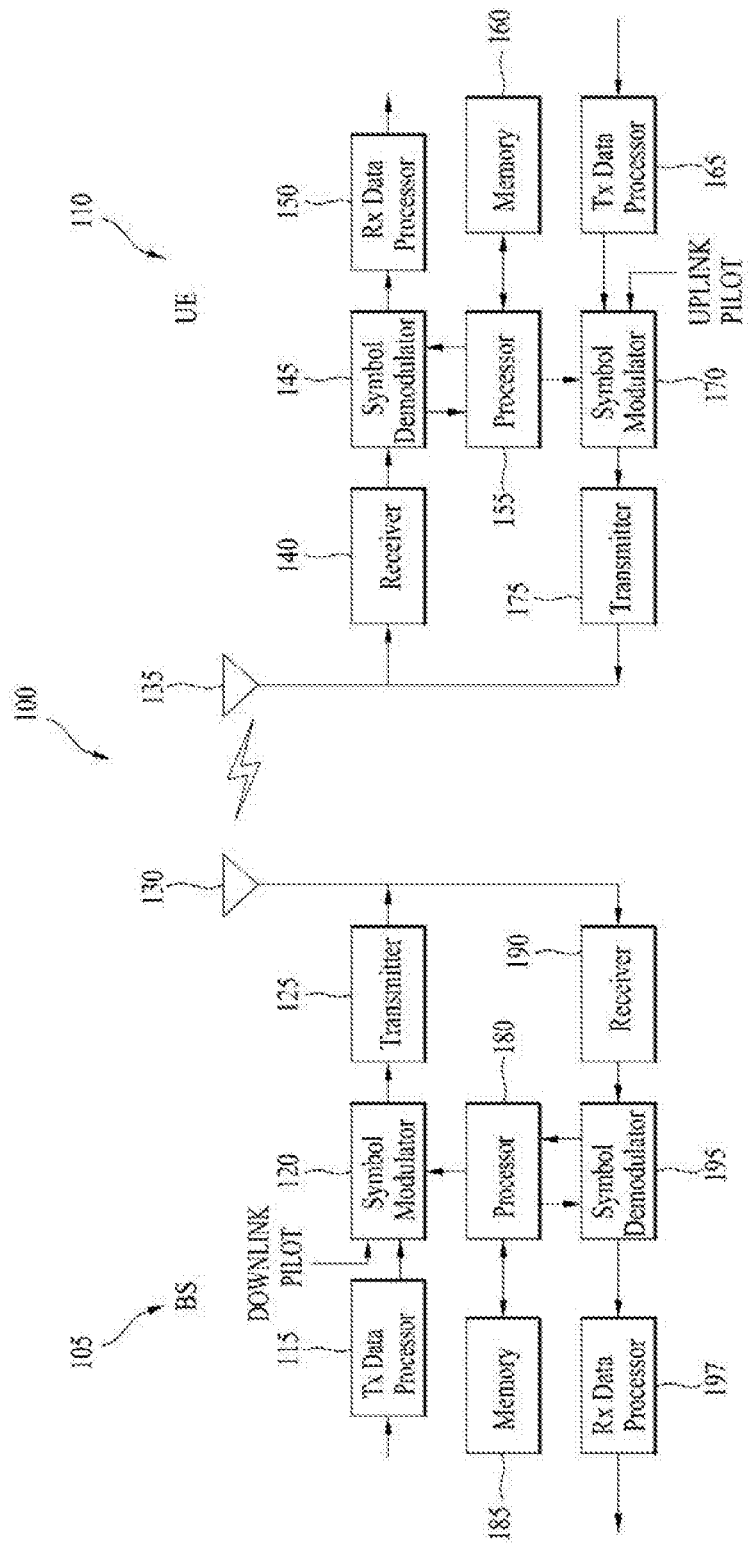
FIG. 2 is a block diagram illustrating configurations of a base station (BS) and a user equipment (UE) in a wireless communication system.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
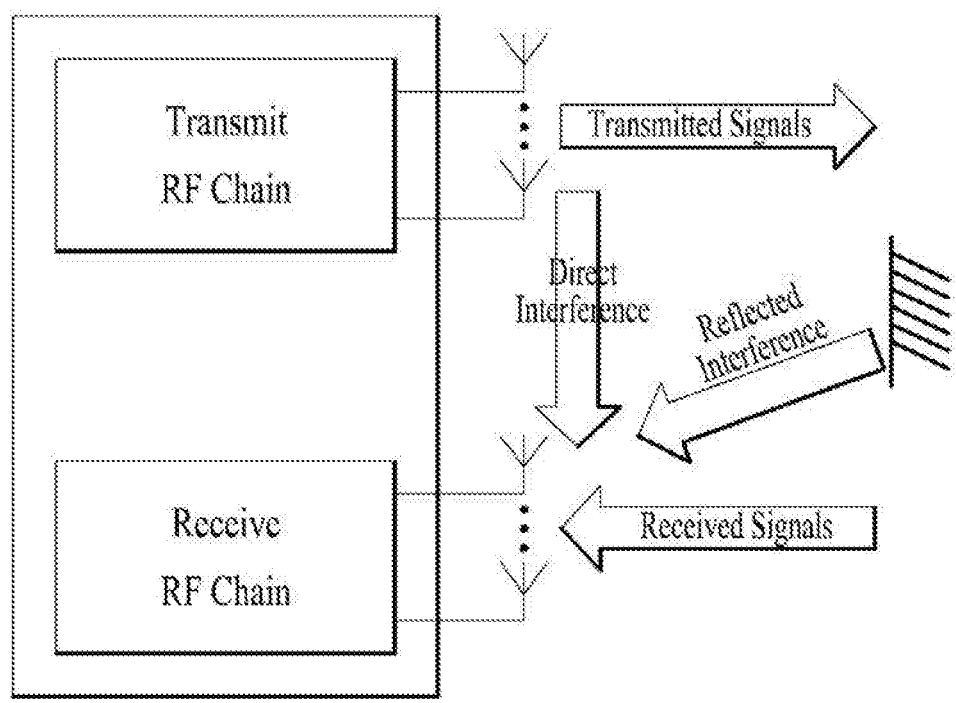
FIG. 3 is a conceptual diagram illustrating transmission/reception (Tx/Rx) links and self-interference (SI) in the FDR communication situation.

FIG. 3 is a conceptual diagram illustrating transmission/reception (Tx/Rx) links and self-interference (SI) in the FDR communication situation.

Referring to FIG. 3, self-interference (SI) may be classified into direct interference corresponding to a signal transmitted from a transmission (Tx) antenna and directly received by a reception (Rx) antenna of the corresponding device without being path-faded, and reflected interference which has been reflected by surrounding topography, and the magnitude of SI is extremely larger than a desired signal due to a physical distance difference. Effective cancellation of SI is indispensable for operation of the FDR system due to the extremely high interference level.

In order to effectively drive the FDR system, requirements of self-interference cancellation (SIC or self-IC) according to maximum Tx power may be determined as shown in Table 1.

TABLE 1

Self-IC requirements when FDR is applied in mobile communication system (BW = 20 MHz)

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 1, it can be known that a UE requires self-IC performance of 115 dB so as to effectively drive the FDR system in a bandwidth of 20 MHz.

Thermal noise value may be changed to $N_{0,BW}$=−174 dBm+10×$\log_{10}$(BW) according to the bandwidth of a mobile communication system and the Table 1 was obtained on the assumption of a bandwidth of 20 MHz. In Table 1, a Receiver Noise Figure (NF) may consider the worst case with reference to 3GPP specification requirement. A receiver thermal noise level may be determined as the sum of thermal noise and receiver NF in a specific BW.

Types and Application Method of Self-IC Scheme

Figure 4:
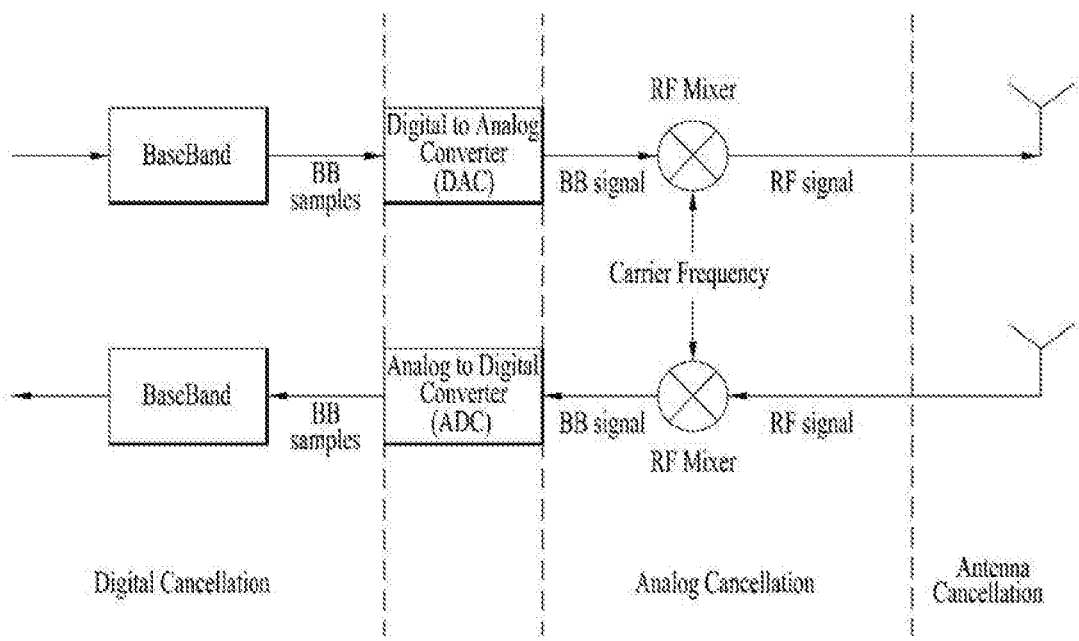
FIG. 4 is a view illustrating exemplary positions to which three interference methods for use in a radio frequency (RF) transceiver (or RF front end) of a device are applied.

FIG. 4 is a view illustrating exemplary positions to which three interference methods for use in a radio frequency (RF) transceiver (or RF front end) of a device are applied. To obtain such self-IC performance, the following three self-IC schemes may be used, and as such a detailed description thereof is as follows.

Antenna Self-IC (Antenna Self-Interference Cancellation)

Antenna self-IC scheme needs to be performed more preferentially from among all self-IC schemes, and SI cancellation is performed at an antenna stage. In the simplest manner, an object capable of blocking a signal may be provided between transmission (Tx) and reception (Rx) antennas so as to physically block transfer of an SI signal, a distance between antennas may be artificially adjusted using multiple antennas, or a specific transmitted signal is phase-inverted to partially cancel the SI signal. In addition, some parts of the SI signal may be cancelled using multiple polarized antennas or a directional antenna.

Analog Self-IC (Analog Self-Interference Cancellation)

This is a method for cancelling interference in an analog stage before a received signal passes through an ADC (Analog-to-Digital Convertor) and cancels an SI signal using a duplicated analog signal. This method may be performed in an RF region or an IF region. A method for cancelling an SI signal will be given below. A transmitted analog signal is time-delayed and then the magnitude and phase thereof are controlled to generate a duplicated signal of an actual received SI signal and the duplicated signal is subtracted from a signal received through a reception antenna. However, additional distortion may occur due to implementation complexity and circuit characteristics since processing is performed using the analog signal, and thus interference cancellation performance may be remarkably varied.

Digital Self-IC (Digital Self-Interference Cancellation)

This is a method for cancelling interference after a received signal passes through an ADC and includes all interference cancellation methods performed in a Baseband region. In the simplest manner, a duplicated signal of SI may be generated using a transmitted digital signal and subtracted from a received digital signal. Alternatively, methods of preventing a transmission signal for a UE or a BS from being received by a reception (Rx) antenna by performing precoding/postcoding in the baseband using multiple antennas may also be classified as digital self-IC. However, digital self-IC is enabled when a signal modulated into a digital signal is quantized such that information about a desired signal can be restored. Accordingly, to perform digital self-IC, a signal power difference between an interference signal which remains after interference cancellation using one or more of the aforementioned methods and a desired signal needs to be within an ADC range.

Figure 5:
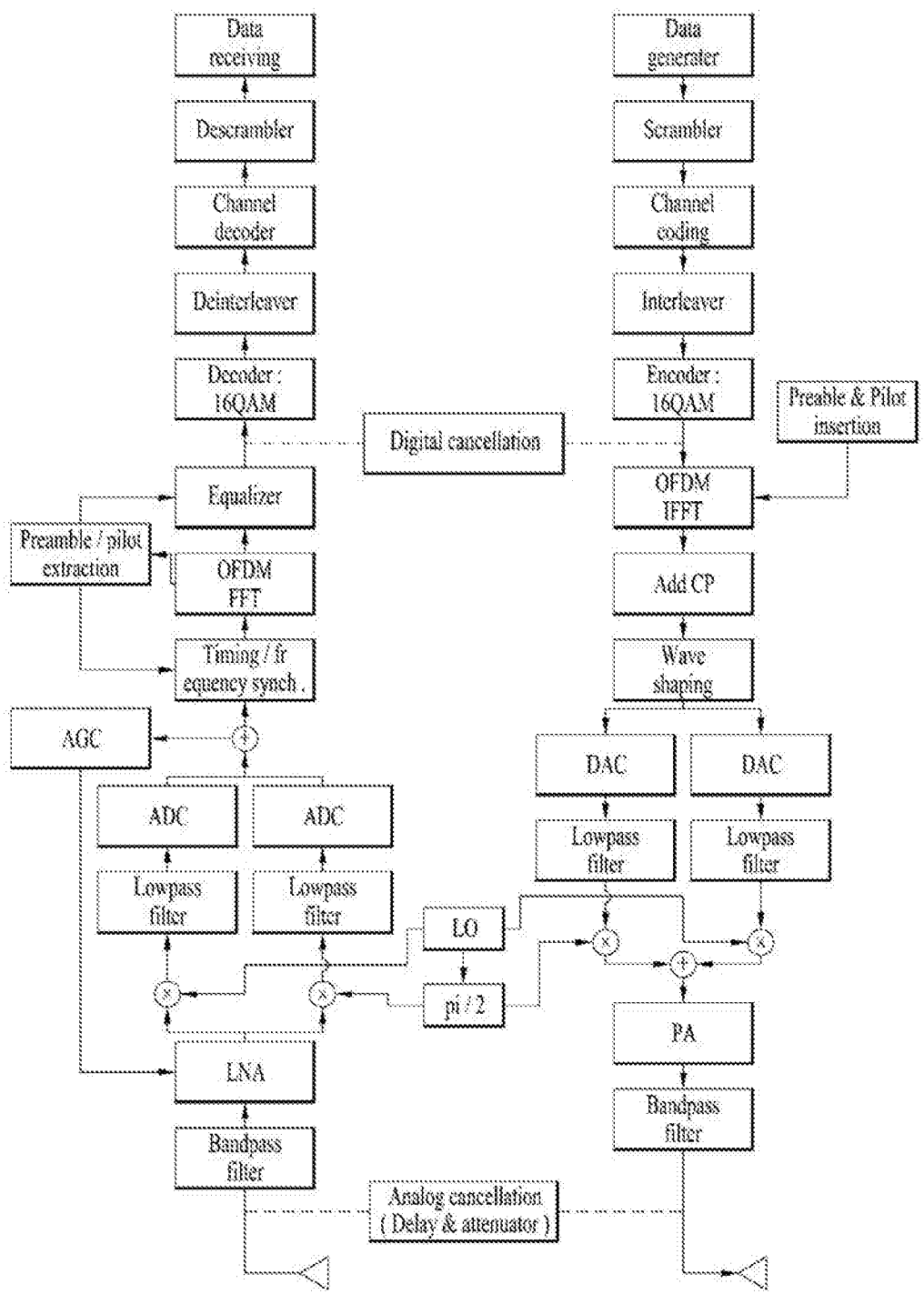
FIG. 5 is a block diagram illustrating a device for performing self-interference cancellation (SIC) in a communication device proposed by an OFDM communication system environment based on FIG. 4.

FIG. 5 is a block diagram illustrating a device for performing self-interference cancellation (SIC) in a communication device proposed by an OFDM communication system environment based on FIG. 4.

Although FIG. 5 exemplarily illustrates that the position of a digital self-IC block directly may use digital SI information obtained before execution of DAC or digital SI information obtained after completion of ADC processing for convenience of description, it should be noted that such digital self-IC block position processing may also be carried out using a digital self-interference (SI) signal after passing through IFFT and before passing through FFT. Furthermore, while FIG. 5 illustrates the concept of cancelling a self-interference signal by separating the Tx antenna and the Rx reception antenna from each other, an antenna configuration different from that of FIG. 5 may be used when an antenna cancellation scheme employing a single antenna is used. In the RF transmitter and the RF receiver shown in FIG. 5, a function block suitable for the purpose may be added or deleted as necessary.

Signal Modeling of FDR System

Since the FDR system uses the same frequency for a transmission signal and a reception signal, RF non-linear components considerably affect the FDR system. Particularly, a transmission signal is distorted due to non-linear characteristics of a power amplifier (PA) and a low noise amplifier (LNA), and the transmission signal due to such distortion may be modeled as generation of components corresponding to high orders. From among the high-order components, an even-order component affects the vicinity of a DC, and thus the component may be effectively removed using conventional AC coupling or filtering. However, an odd-order component is generated around the legacy frequency, and thus it is difficult to easily cancel the odd-order component, differently from the even-order component, considerably affecting reception. In consideration of non-linear characteristics of odd-order component, a reception signal after an ADC in the FDR system may be represented using a parallel Hammerstain (PH) model as shown in the following equation 1.

$$y(n) = \\ h_D(n) * x_D(n) + \sum_{\substack{k=1,\ldots,K \\ k=odd}} h_{SI,k}(n) * |x_{SI}(n)|^{k-1} x_{SI}(n) + z(n), \quad \text{[Equation 1]}$$

In Equation 1, $x_D(n)$ may denote data to be received, $h_D(n)$ may denote a desired channel that the data to be received suffers, and $x_{SI}(n)$ may denote transmitted data. $h_{SI,k}(n)$ may denote a self-channel that the transmitted data suffers, wherein the self-channel is a linear component when k is 1 and the self-channel is a non-linear component when k is an odd number equal to or greater than 3. $z(n)$ may denote Additive White Gaussian Noise (AWGN).

In the FDR system, it is obvious to those skilled in the art that power of self-interference obviously increases as transmission power increases. Accordingly, if the performances of antenna self-interference cancellation (SIC) and analog self-interference cancellation (SIC) are fixed, to obtain desired target SIC performance when transmission (Tx) power increases, the burden of digital self-IC to remove a larger amount of self-interference components increases.

When transmission (Tx) power of a device driven with FDR increases, power of linear self-interference (SI) components and power of non-linear SI components generated according to characteristics of the FDR device may increase at a higher increase rate than that of linear SI component power. The relationship between a transmission power variation and power of a linear SI component and a non-linear SI component may be represented as shown in FIG. 6.

Figure 6:
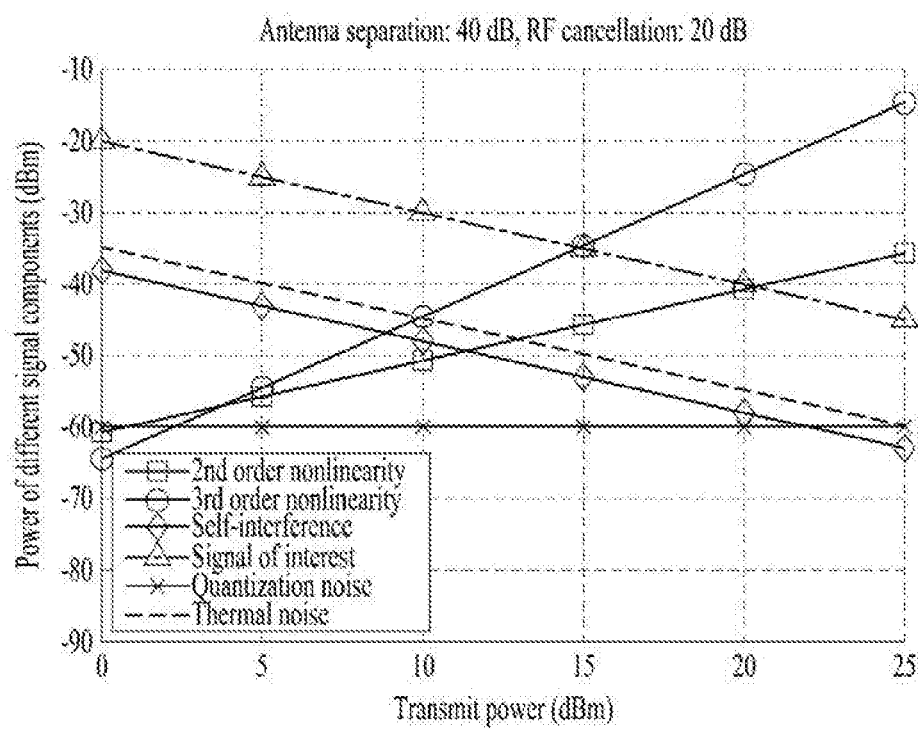
FIG. 6 is a conceptual view illustrating a difference in power between SI components in the FDR system according to transmission (Tx) power variation.

FIG. 6 is a conceptual view illustrating a difference in power between SI components in the FDR system according to transmission (Tx) power variation.

When the transmission (Tx) power is low (less than 10 dBm) as shown in FIG. 6, power of the second order non-linear SI component (square marker) and the third order non-linear SI component (circle marker) is less than thermal noise (dotted line) and thus desired self-interference cancellation (SIC) performance may be obtained only with digital self-IC considering only linear SI components. However, as the transmission (Tx) power increases (more than 10 dBm), the power of the second order non-linear SI component and the third order non-linear SI component increases to exceed the thermal noise and the power of non-linear SI components becomes higher than the power of a desired signal to be received. Accordingly, desired self-interference cancellation performance cannot be obtained only with digital self-IC considering only linear SI components. Furthermore, a reception SINR remarkably decreases due to uncancelled self-interference of high-order components. Therefore, since power of linear and non-linear SI components increases as transmission (Tx) power increases, non-linear digital self-IC considering even non-linear SI components which are not considered in the conventional schemes needs to be designed for stabilized FDR system operation.

In addition, when non-linear digital self-IC is designed as described above, it is necessary to not only correctly estimate power variation of non-linear SI components according to transmission (Tx) power variation but also set an accurate reference order for which estimation of non-linear SI component is considered.

Figure 7:
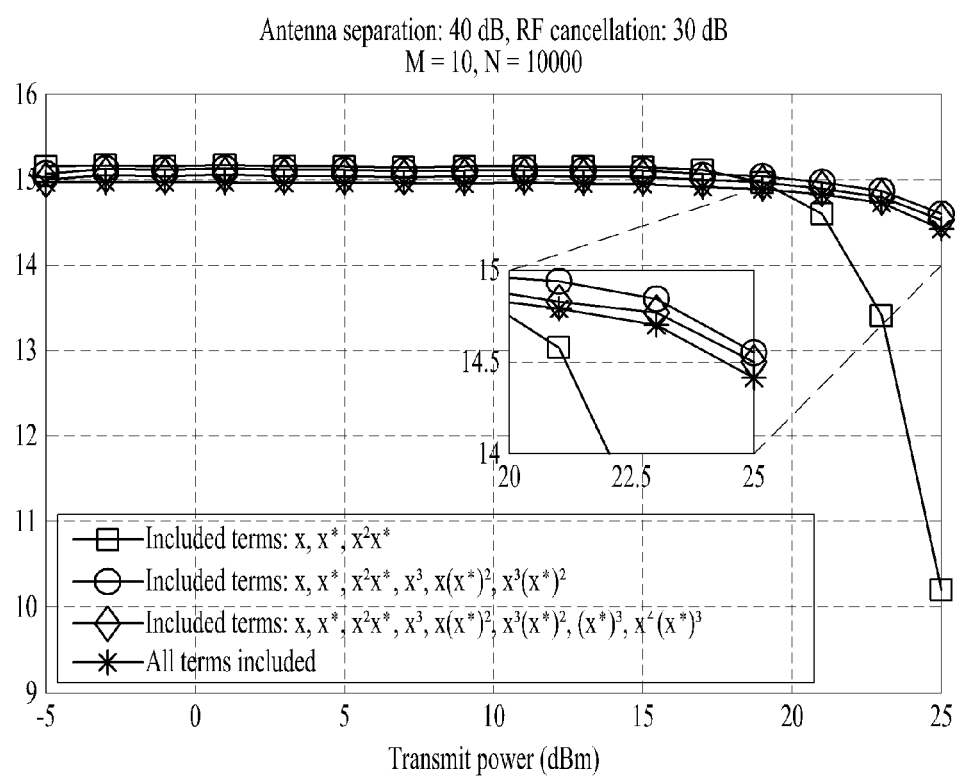
FIG. 7 is a conceptual diagram illustrating reception (Rx) SINR after completion of Non-linear Digital Self-IC according to Tx power variation in consideration of various higher order non-linear SI components.

FIG. 7 is a conceptual diagram illustrating reception (Rx) SINR after completion of Non-linear Digital Self-IC according to Tx power variation in consideration of various higher order non-linear SI components.

When the performances of the antenna and RF self-IC are respectively fixed to 40 dB and 30 dB, as shown in FIG. 7 (total 70 dB), it can be seen from FIG. 7 the performance of non-linear digital self-IC considering the third order non-linear SI and the performance of non-linear digital self-IC considering higher non-linear SI are similar when the transmission (Tx) power is low (less than 20 dBm). However, when the transmission power is higher than 20 dBm, the performance of non-linear digital self-IC performance (5th order, 7th order, all terms) considering orders higher than the third order is relatively high, compared to the graph considering up to third order. This is because power of high-order non-linear SI components increases as the transmission (Tx) power increases.

Furthermore, it can be confirmed that the performance of non-linear digital self-IC considering only low orders is higher than the performance of non-linear digital self-IC considering even high orders when the transmission power is less than 15 dBm. Particularly, when the transmission power increases to range between 15 dBm and 25 dBm, the performance of non-linear digital self-IC considering only up to the fifth order is higher than the performance of non-linear digital self-IC considering only up to the seventh order or considering all orders. Consequently, it can be known that non-linear digital Self-IC requires estimation of non-linear SI of appropriate orders according to transmission power.

FIG. 7 shows a result when the performances of antenna self-IC and RF self-IC are respectively fixed to 40 dB and 30 dB and high self-interference cancellation performance of 70 dB is obtained before ADC. If the performances of the antenna self-IC and RF self-IC are deteriorated, power of non-linear SI components as well as linear SI components remarkably increases after passing through ADC, and thus the burden of non-linear digital self-IC unavoidably increases. Consequently, it is necessary to estimate non-linear SI of appropriate orders according to not only transmission power variation but also performance variation after the antenna and RF self-IC.

Channel Estimation

In order to discriminate between a non-linear SI component and a linear SI component as well as to cancel the non-linear SI component and the linear SI component in different ways, an algorithm for channel estimation of the non-linear SI component and an algorithm for channel estimation of the linear SI component are needed. A method for effectively estimating a non-linear channel component and a linear channel component will hereinafter be given. If the SI reception (Rx) signal other than data to be received as illustrated in Equation 1 is represented as a vector format on a time domain, the following equation 2 is obtained.

[Formula 2]

$$\begin{bmatrix} y[1] \\ y[2] \\ \vdots \\ y[N] \end{bmatrix} = \begin{bmatrix} x_{SI}^1[1] & \ldots & x_{SI}^1[-(L-1)] & x_{SI}^3[1] & \ldots & x_{SI}^3[-(L-1)] & \ldots & x_{SI}^{2K+1}[1] & \ldots & x_{SI}^{2K+1}[-(L-1)] \\ x_{SI}^1[2] & \ldots & x_{SI}^1[-(L-2)] & x_{SI}^3[2] & \ldots & x_{SI}^3[-(L-2)] & \ldots & x_{SI}^{2K+1}[2] & \ldots & x_{SI}^{2K+1}[-(L-2)] \\ x_{SI}^1[3] & \ldots & x_{SI}^1[-(L-3)] & x_{SI}^3[3] & \ldots & x_{SI}^3[-(L-3)] & \ldots & x_{SI}^{2K+1}[3] & \ldots & x_{SI}^{2K+1}[-(L-3)] \\ \vdots & & \vdots & \vdots & & \vdots & & \vdots & & \vdots \\ \vdots & & \vdots & \vdots & & \vdots & & \vdots & & \vdots \\ x_{SI}^1[N] & \ldots & x_{SI}^1[(N-L+1)] & x_{SI}^3[N] & \ldots & x_{SI}^3[(N-L+1)] & \ldots & x_{SI}^{2K+1}[N] & \ldots & x_{SI}^{2K+1}[(N-L+1)] \end{bmatrix} \begin{bmatrix} h_1^1 \\ \vdots \\ h_L^1 \\ h_3^1 \\ \vdots \\ h_L^3 \\ \vdots \\ h_1^{2K+1} \\ \vdots \\ h_L^{2K+1} \end{bmatrix} + n$$

$$= \Theta \begin{bmatrix} h_1^1 \\ \vdots \\ h_L^1 \\ h_3^1 \\ \vdots \\ h_L^3 \\ \vdots \\ h_1^{2K+1} \\ \vdots \\ h_L^{2K+1} \end{bmatrix} + n$$

Figure 8:
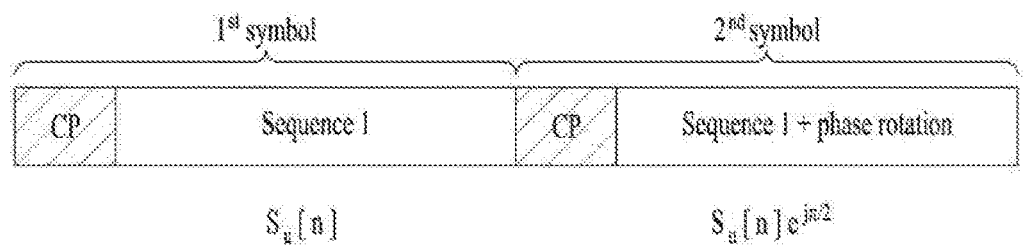
FIG. 8 is a conceptual diagram illustrating a transmission (Tx) symbol structure for non-linear channel estimation.

First, the symbol structure of FIG. 8 may be considered. FIG. 8 is a conceptual diagram illustrating a transmission (Tx) symbol structure for non-linear channel estimation.

Referring to FIG. 8, a first symbol may include not only a sequence $s_u[n]$ in which a root value is set to 'u' and has the length of $N_{ZC}$, but also a CP. A second symbol may include not only a sequence obtained when $e^{j\pi/2}$ is multiplied by $s_u[n]$ used in the first symbol, but also a CP. Here, although $e^{j\pi/2}$ is changed to $e^{-j\pi/2}$, the same operation result may be obtained. In addition, it may also be possible to acquire another format obtained when $e^{j\pi/2}$ is multiplied by the first symbol and $e^{j\pi/2}$ is removed from the second symbol. In other words, assuming that a phase difference between two sequences is denoted by $e^{j\pi/2}$, no problems occur.

In FIG. 8, the first symbol may be constructed on the time domain. A Zadoff-Chu sequence $$x_u[n] = e^{-j\frac{\pi un(n+1)}{N_{ZC}^{RS}}}, 0 \leq n \leq N_{ZC}^{RS} - 1$$

having a root value (u) may be generated, and a part corresponding to the CP length on the basis of $x_u[n]$ is duplicated, the part is added to the front part of the symbol, resulting in implementation of $s_u[n]$.

The second symbol may be constructed as denoted by $s_u[n] \cdot e^{j\pi/2}$ or $s_u[n] \cdot e^{-j\pi/2}$. In addition, sequences may be generated in a frequency axis using the relationship of DFT and IDFT, such that the above time-axis sequence can be generated. In addition, the second symbol may be dynamically constructed according to the sequence length $N_{ZC}^{RS}$, the symbol length of a system, and the CP length. In order to adjust the symbol length, the additional sequence may be cyclically constructed as shown in the following equation 3.

$$x_u[n] = \bar{x}[\text{mod}(n, N_{ZC}^{RS})], 0 \leq n \leq L_{symbol} - 1 \quad \text{[Equation 3]}$$

$$\bar{x}[m] = e^{-j\frac{\pi um(m+1)}{N_{ZC}^{RS}}}, 0 \leq m \leq N_{ZC}^{RS} - 1$$

Meanwhile, the symbol length may be adjusted through adjustment of the CP length, or a zero value may be inserted into the rear part of the symbol such that the satisfactory result can be acquired.

It is assumed that the channels of two symbols are identical to each other.

For convenience of description, the value of u is set to 1 (i.e., u=1), the Rx signal of the first symbol acquired when the corresponding symbol structure is applied to Equation 2 is represented by the following equation 4.

$$y_1 = \begin{bmatrix} y[1] \\ y[2] \\ \vdots \\ y[N] \end{bmatrix} = [s_1^0 \ s_1^1 \ \ldots \ s_1^{L-1}] \begin{bmatrix} h_1^1 \\ h_2^1 \\ \vdots \\ h_L^1 \end{bmatrix} + [s_3^0 \ s_3^1 \ \ldots \ s_3^{L-1}] \begin{bmatrix} h_1^3 \\ h_2^3 \\ \vdots \\ h_L^3 \end{bmatrix} + \ldots + \quad \text{[Equation 4]}$$

$$[s_{2K+1}^0 \quad s_{2K+1}^1 \quad \ldots \quad s_{2K+1}^{L-1}]\begin{bmatrix} h_1^{2K+1} \\ h_2^{2K+1} \\ \vdots \\ h_L^{2K+1} \end{bmatrix} + n$$

In Equation 4, $s_u^c$ is a sequence vector which has a root value (u) and is cyclically shifted by a specific value (c). The root values of third-order and high-order components may be determined by characteristics shown in the following expression.

$$s_u^k[n] = \left[\exp\left\{\frac{-j\pi u n(n+1)}{N_{ZC}}\right\}\right]^k$$

$$= \exp\left\{\frac{-j\pi k u n(n+1)}{N_{ZC}}\right\}$$

$$= s_{ku}[n].$$

In Equation 4, if $(s_1^0)^H$ is multiplied by the Rx signal, the following equation 5 is obtained.

$$z_1^0 = [N_{zc} \quad 0 \quad \ldots \quad 0]\begin{bmatrix} h_1^1 \\ h_2^1 \\ \vdots \\ h_L^1 \end{bmatrix} + [d_{1,3}^{0,0} \quad d_{1,3}^{0,1} \quad \ldots \quad d_{1,3}^{0,L-1}]$$ [Equation 5]

$$\begin{bmatrix} h_1^3 \\ h_2^3 \\ \vdots \\ h_L^3 \end{bmatrix} + \ldots + [d_{1,2K+1}^{0,0} \quad d_{1,2K+1}^{0,1} \quad \ldots \quad d_{1,2K+1}^{0,L-1}]$$

$$\begin{bmatrix} h_1^{2K+1} \\ h_2^{2K+1} \\ \vdots \\ h_L^{2K+1} \end{bmatrix} + n$$

$$= N_{zc}h_1^1 + I_{1,3}^0 + \ldots + I_{1,2K+1}^0 + n'$$

In Equation 5, $$d_{u1,u2}^{k1,k2} = (s_{u1}^{k1})^H \cdot s_{u2}^{k2}$$

may be acquired, and $I_{u1,u2}^k$ is represented by the following equation 6.

$$I_{u1,u2}^k = [d_{u1,u2}^{k,0} \quad d_{u1,u2}^{k,1} \quad \ldots \quad d_{u1,u2}^{k,L-1}]\begin{bmatrix} h_1^{u2} \\ h_2^{u2} \\ \vdots \\ h_L^{u2} \end{bmatrix}.$$ [Equation 6]

Accordingly, a general expression may be represented by the following equation 7.

[Equation 7]

Demod.sequence for (k + 1)-th channel tap $$Z_m^k = I_{m,1}^k + I_{m,3}^k + \ldots + N_{ZC}h_m^{k+1} + \ldots + I_{m,3}^k + n'$$

m-order for m = 1, 3, ..., 2K + 1

Similar to Equation 4, the second symbol $y_2$ may be represented by the following equation 8.

$$y_2 = e^{j\pi/2}[s_1^0 \quad s_1^1 \quad \ldots \quad s_1^{L-1}]\begin{bmatrix} h_1^1 \\ h_2^1 \\ \vdots \\ h_L^1 \end{bmatrix} +$$ [Equation 8]

$$e^{j3\pi/2}[s_3^0 \quad s_3^1 \quad \ldots \quad s_3^{L-1}]\begin{bmatrix} h_1^3 \\ h_2^3 \\ \vdots \\ h_L^3 \end{bmatrix} + \ldots +$$

$$e^{j(2K+1)\pi/2}[s_{2K+1}^0 \quad s_{2K+1}^1 \quad \ldots \quad s_{2K+1}^{L-1}]\begin{bmatrix} h_1^{2K+1} \\ h_2^{2K+1} \\ \vdots \\ h_L^{2K+1} \end{bmatrix} + n_2$$

Differently from demodulation of the first symbol, the phase is additionally considered, such that the following equation 9 can be obtained.

$$z_m^{-k} = (s_m^k e^{jm\pi/2})^H y_2 = (-1)^{(m-1)/2}I_{m,1} + (-1)^{(m-1)/2}$$
$$I_{m,3}^k + \ldots + N_{ZC}h_m^{k+1} + \ldots + (-1)^{(m-1)/2}I_{m,3}^k + n_2'$$
for $m=1,3,\ldots,2K+1$ [Equation 9]

If Equation 7 and Equation 9 are added, the estimated value of a desired result $h_m^k$ may be denoted by $\hat{h}_m^k$. A detailed description thereof will hereinafter be described with reference to the following embodiments.

Embodiment #1

In Embodiment #1, it is assumed that the channel length (L) is set to 5 (i.e., L=5) and the maximum non-linearity order is set to 5. In this case, channel estimation may be achieved according to the following order.

1) First, a method for calculating the first channel (tap) of the first order of $\hat{h}_1^1$ is as follows.

The following equation 10 can be obtained using the above-mentioned equations 7 and 9.

$$z_1^0 = N_{ZC}h_1^1 + I_{1,3}^0 + I_{1,5}^0 + n'$$

$$z_1^{-0} = N_{ZC}h_1^1 - I_{1,3}^0 + I_{1,5}^0 + n_2'$$ [Equation 10]

Two expressions shown in Equation 10 can be obtained, and the following equation 11 can be obtained using two expressions of Equation 10.

$$\hat{h}_1^1 = \frac{z_1^0 + z_1^{-0}}{2N_{zc}} = h_1^1 + I_{1,5}^0/N_{zc} + \tilde{n}/N_{zc}$$ [Equation 11]

2) In addition, $\hat{h}_2^1, \ldots, \hat{h}_5^1$ can be obtained using the above equation 11.

3) The estimated value $\hat{h}_1^3$ of the $3^{rd}$-order first channel (tap) can be calculated as follows.

In the same manner, the following equation 12 can be acquired using Equations 7 and 9.

$$z_3^0 = I_{3,1}^0 + N_{ZC}h_1^3 + I_{3,5}^0 + n'$$

$$z_3^{-0} = -I_{3,1}^0 + N_{ZC}h_1^3 - I_{3,5}^0 + n_2' \quad \text{[Equation 12]}$$

Two expressions of Equation 12 are obtained, and the following equation 13 can be acquired using the above equation 12.

$$\hat{h}_1^3 = \frac{z_3^0 + \bar{z}_3^0}{2N_{zc}} = h_1^3 + \tilde{n}/N_{zc} \quad \text{[Equation 13]}$$

4) In addition, $\hat{h}_2^3, \ldots, \hat{h}_5^3$ may also be calculated in the same manner as described above.

5) Finally, the fifth-order first channel (tap) ($\hat{h}_1^5$) may be pre-removed from the Rx signal (y) using linear components ($\hat{h}_1^1, \ldots, \hat{h}_5^1$) and the value of $s_1$. Thereafter, if the calculation process is achieved using the following schemes, the following equation 14 can be obtained.

$$z_5^0 = I_{5,3}^0 + N_{ZC}h_1^5 + n' + \text{residual}$$

$$z_5^{-0} = -I_{5,3}^0 + N_{ZC}h_1^5 + n_2' + \text{residual} \quad \text{[Equation 14]}$$

In Equation 14, "residual" may denote errors caused by channel estimation errors of $$\left(h_m^1 - \hat{h}_m^1\right).$$

As a result, the following equation 15 can be obtained according to the above-mentioned results.

$$\hat{h}_1^5 = \frac{z_5^0 + \bar{z}_5^0}{2N_{zc}} = h_1^5 + (\tilde{n} + +\text{residual})/N_{zc} \quad \text{[Equation 15]}$$

6) $\hat{h}_1^5, \ldots, \hat{h}_5^5$ may also be acquired in the same manner as described above.

Embodiment #2: It is assumed that the channel length (L) is set to 5 (i.e., L=5) and the maximum non-linearity order is set to 9. In this case, channel estimation may be achieved according to the following order.

1) First, a method for calculating the first channel (tap) of the first order of $\hat{h}_1^1$ is as follows.

The following equation 16 can be obtained using the above-mentioned equations 7 and 9.

$$z_1^0 = N_{ZC}h_1^1 + I_{1,3}^0 + I_{1,5}^0 + I_{1,7}^0 + I_{1,9}^0 + n'$$

$$z_1^{-0} = N_{ZC}h_1^1 - I_{1,3}^0 + I_{1,5}^0 - I_{1,7}^0 + I_{1,9}^0 + n_2' \quad \text{[Equation 16]}$$

Two expressions of Equation 16 are obtained, and the following equation 17 can be acquired using two expressions of the above equation 16.

$$\hat{h}_1^1 = \frac{z_1^0 + \bar{z}_1^0}{2N_{zc}} = h_1^1 + I_{1,5}^0/N_{zc} + I_{1,9}^0/N_{zc} + \tilde{n}/N_{zc} \quad \text{[Equation 17]}$$

2) In addition, $\hat{h}_2^1, \ldots, \hat{h}_5^1$ may also be calculated in the same manner as described above.

3) The estimated value $\hat{h}_1^3$ of the $3^{rd}$-order first channel (tap) can be calculated as follows.

In the same manner, the following equation 18 can be acquired using Equations 7 and 9.

$$z_3^0 = I_{3,1}^0 + N_{ZC}h_1^3 + I_{3,5}^0 + I_{3,7}^0 + I_{3,9}^0 + n'$$

$$z_3^{-0} = -I_{3,1}^0 + N_{ZC}h_1^3 - I_{3,5}^0 + I_{3,7}^0 - I_{3,9}^0 + n_2' \quad \text{[Equation 18]}$$

After two expressions of the equation 18 are obtained, the following equation 19 can be obtained using two expressions of the above equation 18.

$$\hat{h}_1^3 = \frac{z_3^0 + \bar{z}_3^0}{2N_{zc}} = h_1^3 + I_{3,7}^0/N_{zc} + \tilde{n}/N_{zc} \quad \text{[Equation 19]}$$

4) In addition, $\hat{h}_2^3, \ldots, \hat{h}_5^3$ may be acquired in the same manner as described above.

5) Thereafter, the fifth-order first channel (tap) ($\hat{h}_1^5$) may be pre-removed from the Rx signal (y) using linear components ($\hat{h}_1^1, \ldots, \hat{h}_5^1$) and the value of $s_1$. Thereafter, if the calculation process is achieved using the following schemes, the following equation 20 can be obtained.

$$z_5^0 = I_{5,3}^0 + N_{ZC}h_1^5 + I_{5,7}^0 + I_{5,9}^0 + n' + \text{residual}$$

$$z_5^{-0} = -I_{5,3}^0 + N_{ZC}h_1^5 - I_{5,7}^0 + I_{5,9}^0 + n_2' + \text{residual} \quad \text{[Equation 20]}$$

In Equation 20, "residual" may denote errors caused by channel estimation errors of $$\left(h_m^1 - \hat{h}_m^1\right).$$

As a result, the following equation 21 can be finally obtained according to the above-mentioned results.

$$\hat{h}_1^5 = \frac{z_5^0 + \bar{z}_5^0}{2N_{zc}} = h_1^5 + (\tilde{n} + +\text{residual} + I_{5,9}^0)/N_{zc} \quad \text{[Equation 21]}$$

6) $\hat{h}_1^5, \ldots, \hat{h}_5^5$ may also be acquired in the same manner as described above.

7) Thereafter, the seventh-order first channel (tap) ($\hat{h}_1^7$) may be pre-removed from the Rx signal (y) using linear components ($\hat{h}_1^3, \ldots, \hat{h}_5^3$) and the value of $s_3$. Thereafter, if the calculation process is achieved using the following schemes, the following equation 22 can be obtained.

$$z_7^0 = I_{7,1}^0 + I_{7,5}^0 + N_{ZC}h_1^7 + I_{5,9}^0 + n' + \text{residual}$$

$$z_7^{-0} = -I_{7,1}^0 - I_{7,5}^0 + N_{ZC}h_1^7 - I_{5,9}^0 + n_2' + \text{residual} \quad \text{[Equation 22]}$$

The following equation 23 can be acquired using the above equation 22.

$$\hat{h}_1^7 = \frac{z_7^0 + \bar{z}_7^0}{2N_{zc}} = h_1^7 + (\tilde{n} + +\text{residual})/N_{zc} \quad \text{[Equation 23]}$$

6) $\hat{h}_2^7, \ldots, \hat{h}_5^7$ may also be acquired in the same manner as described above.

In the same manner as described above, the ninth order value is first removed from the Rx signal using the channel estimation values corresponding to the $1^{st}$ order and the fifth order, and is then obtained.

Figure 9:
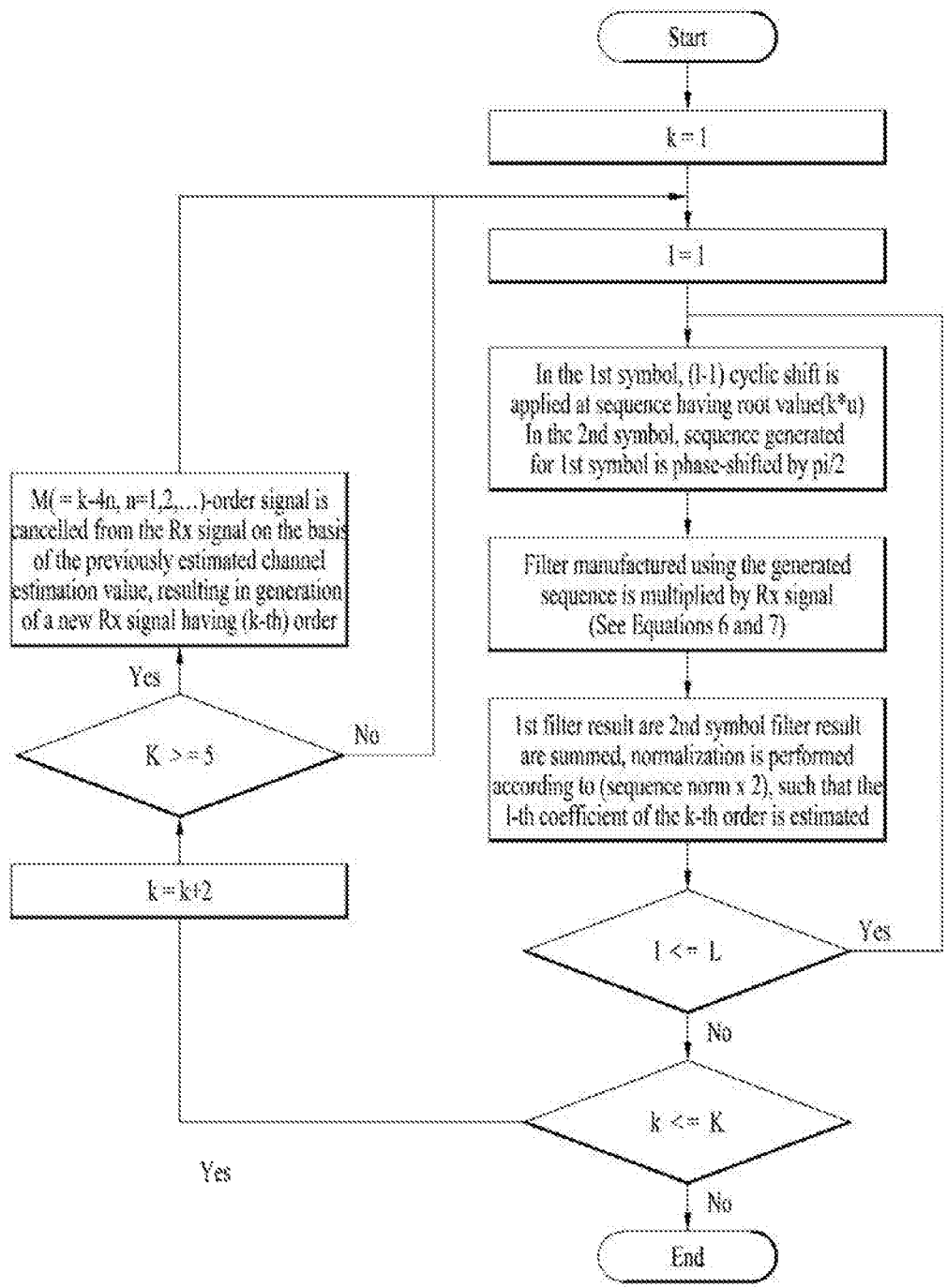
FIG. 9 is a flowchart illustrating a detailed procedure of self-channel coefficient estimation.

Finally, the algorithm for channel estimation may be based on the procedures of FIG. 9. FIG. 9 is a detailed procedure of self-channel coefficient estimation.

In conclusion, data transmission is achieved using the symbol structure of FIG. 8, and the self-interference channel estimation value can be obtained through the procedures of FIG. 9. Thereafter, the obtained value is combined with the sequence, such that self-interference cancellation can be achieved finally.

A method for performing adaptively digital self-IC in consideration of the degree of non-linearity of the BS or UE configured to operate in FDR will hereinafter be described.

As described above, the order of non-linear digital self-IC to be executed can be changed according to change of Tx power and change of the antenna self-IC and RF self-interference performances. The conventional methods have performed the fixed-order non-linear digital Self-IC according to the linear digital self-IC or the maximum Tx power without consideration of the change of Tx power. As a result, the non-linear digital Self-IC performance may be deteriorated. Accordingly, there is a need to adaptively change and establish the non-linear digital self-IC order, which needs to be considered in self-interference cancellation (SIC) according to the non-linearity degree of the FDR-based BS or UE, according to power of non-linear SI measured by channel estimation.

Non-linearity may be changed according to Tx power and performances of the antenna self-IC and RF self-IC. Therefore, calculation for measurement of the change of non-linearity degree may be achieved according to the estimation result of the multiple-delay channel environment. Through the algorithm illustrated in FIG. 9, channel estimation for each order and channel estimation for each delay tap can be achieved in the multiple-delay channel environment. According to the channel estimation result obtained from the environment in which the multiple-delay channel length is set to L, the channel estimation value for each order and the channel estimation value for each delay tap can be assumed as follows.

$1^{st}$: $\hat{h}_1[1], \hat{h}_1[2], \ldots, \hat{h}_1[L]$, $3^{rd}$: $\hat{h}_3[1], \hat{h}_3[2], \ldots, \hat{h}_3[L]$, $5^{th}$: $\hat{h}_5[1], \hat{h}_5[2], \ldots, \hat{h}_5[L]$, $7^{th}$: $\hat{h}_7[1], \hat{h}_7[2], \ldots, \hat{h}_7[L]$ Power for each order can be determined on the basis of the above channel estimation value as shown in the following equation 24.

$$P_n = \frac{\sum_{k=1}^{L} |\hat{h}_n[k]|^2}{i} \quad [\text{Equation 24}]$$

Figure 10:
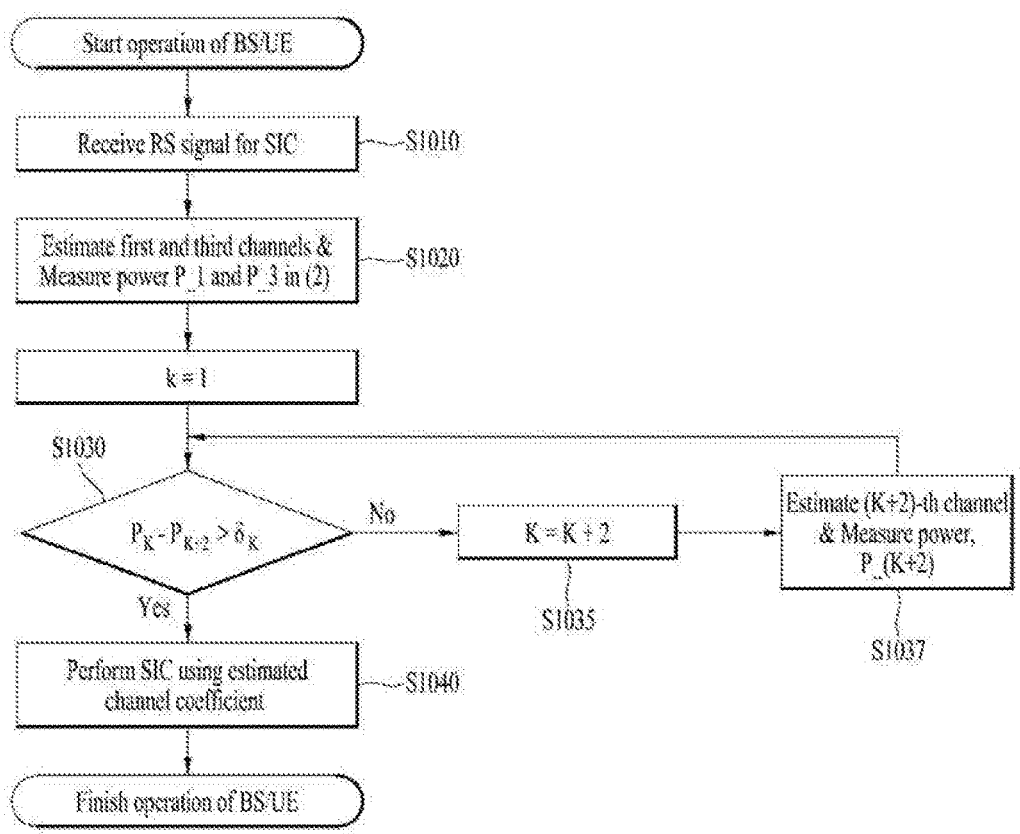
FIG. 10 is a conceptual diagram illustrating an adaptive algorithm for adaptively performing digital self-interference cancellation (SIC) in consideration of the order according to the degree of non-linearity of an FDR-based device (BS or UE).

On the basis of the above-mentioned obtained value, the non-linearity degree can be measured through a difference between orders. For example, when a difference of −50 dB or more is present between the power $P_3$ of a third-order non-linear signal and linear channel estimation power $P_1$, power ($P_5, P_7 \ldots$) of high-order components exceeding the third order becomes similar to or lower than noise floor and thus a degree of influence of non-linear SI on SIC is very insignificant. Accordingly, it is unnecessary to perform SIC through additional estimation of fifth and seventh channels. Through the aforementioned procedure, self-interference cancellation can be efficiently performed using an adaptive algorithm having low complexity. FIG. 10 is a flowchart illustrating an adaptive algorithm.

FIG. 10 is a conceptual diagram illustrating an adaptive algorithm for adaptively performing digital self-interference cancellation (SIC) in consideration of the order according to the degree of non-linearity of an FDR-based device (BS or UE).

Referring to FIG. 10, the device may receive and detect self-interference cancellation (SIC) reference signal (S1010), and may perform $1^{st}$ and $3^{rd}$ order channel estimation through the above-mentioned algorithm, and may calculate the levels of signals of the two orders through Equation 24 on the basis of the estimated channels. Subsequently, values of $P_1$ (the level of $1^{st}$ order signal) and $P_3$ (the level of $3^{rd}$ order signal) are compared with each other. When the difference between the two values exceeds a predefined value $\delta_1$, it can be considered that estimation of fifth and seventh order channels which are higher order channels and the SIC algorithm need not be performed since the level of the third order non-linear signal is relatively low.

Conversely, when the difference between the two values ($P_1$ and $P_3$) is less than $\delta_1$, the level of the third order non-linear signal is relatively high and thus the corresponding non-linear SI signal needs to be cancelled. In this manner, the algorithm is executed while increasing the order. For example, the order is increased by 2 (S1035), such that the channel estimation and power ($P_5$) of the fifth order can be measured (S1037). Thereafter, the processing step returns to S1030, such that the algorithm for comparing the difference between $P_3$ and $P_5$ with the predefined value ($\delta_3$) is carried out.

Here, predefined values $\delta_k$ can be previously calculated and established in a table. For example, optimized $\delta_k$ values can be calculated in FDR situation. For example, only the first and third order signals are interference-cancelled when a reception power difference therebetween is 30 dB or more, and the power of the fifth order signal is additionally calculated and a difference between the powers of the third and fifth order signals is calculated when the reception power difference between the first and third orders signals is less than 30 dB by setting the values to $\delta_1$=30 dB, $\delta_3$=20 dB, $\delta_5$=10 dB, . . . . When the difference is less than 20 dB, the power of the seventh order signal is calculated to check whether the difference is 10 dB or more. In addition, the value $\delta_k$ may be changed according to situations (an antenna/analog/digital SIC algorithm, types of transmission and reception RF chain elements, a configuration of an RS for non-linear SI channel estimation and the like).

The algorithm shown in FIG. 10 can be performed on the basis of actual measurement of non-linearity to determine more accurate orders and SIC performance can be maximized based on the accurate orders.

As is apparent from the above description, the embodiment of the present invention performs adaptive SIC according to non-linearity degree generated due to transmission (Tx) power of a UE and a BS, antennas or RF self-interference cancellation (SIC or self-IC) performance variation in a FDR transmission/reception (Tx/Rx) system, resulting in improvement of communication performance in the FDR environment.

The method and apparatus for performing self-interference cancellation (SIC) in the FDR environment may be applied to various wireless communication systems such as 3GPP LTE-A, 5G communication system, etc.

The embodiments of the present invention may be implemented through various means, for example, hardware, firmware, software, or a combination thereof. When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

The above-described embodiments correspond to combinations of elements and features of the present invention in prescribed forms. In addition, the respective elements or features may be considered selective unless explicitly mentioned otherwise. Each of the elements or features can be implemented in a form failing to be combined with other elements or features. Moreover, it is possible to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. In addition, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for an apparatus performing digital self-interference cancellation (SIC) of a full duplex radio (FDR) mode in a wireless communication system, the method comprising:
    performing channel estimation based on a self-interference reference signal (RS);
    obtaining power values of two order components of the self-interference RS based on the channel estimation; and
    configuring a specific order of a non-linear component of the self-interference RS for cancellation based on a difference value between the obtained power values,
    wherein a value is configured based on types of elements of transmission and reception radio frequency (RF) chains having non-linear characteristics in the apparatus, and
    wherein the value is used for configuring the specific order.

2. The method according to claim 1, further comprising configuring a higher order of the two order components as the specific order when the difference value is greater than or equal to the configured value.

3. The method according to claim 1, further comprising:
    configuring an increased order as the specific order when the difference value is smaller than the configured value, wherein the increased order is an order that is increased by 2 for a higher order of the two order components;
    performing channel estimation for the increased order; and
    obtaining a power value of the increased order based on the channel estimation.

4. The method according to claim 1, wherein the specific order is an odd-order.

5. The method according to claim 4, wherein the two order components are a first order component and a third order component.

6. The method according to claim 1, wherein the power values are obtained based on at least a predefined multiple-delay channel length, a channel estimation value for each of the two order components, a channel estimation value for each of a plurality of delays, or a channel estimation value for each of a plurality of taps.

7. The method according to claim 1, further comprising performing the SIC based on channel coefficients estimated up to the specific order.

8. The method according to claim 3, further comprising:
    performing the SIC based on channel coefficients estimated up to the increased order.

9. An apparatus for performing digital self-interference cancellation (SIC) in a full duplex radio (FDR) mode, the apparatus comprising:
    transmission and reception radio frequency (RF) chains; and
    a processor configured to:
    perform channel estimation based on a self-interference reference signal (RS);
    obtain power values of two order components of the self-interference RS based on the channel estimation; and
    configure a specific order of a non-linear component of the self-interference RS for cancellation based on a difference value between the obtained power values,
    wherein a value is configured based on types of elements of transmission and reception radio frequency (RF) chains having non-linear characteristics in the apparatus, and
    wherein the value is used for configuring the specific order.

10. The apparatus according to claim 9, wherein the processor is further configured to configure a higher order of the two order components as the specific order when the difference value is greater than or equal to the configured value.

11. The apparatus according to claim 9, wherein when the difference value is smaller than the value, the processor is further configured to:
    configure an increased order as the specific order when the difference value is smaller than the configured value, wherein the increased order is an order that is increased by 2 for a higher order of the two order components;

perform channel estimation for the increased order; and obtain a power value of the increased order based on the channel estimation.

12. The apparatus according to claim 9, wherein the specific order is an odd-order.

13. The apparatus according to claim 12, wherein the two order components are a first order component and a third order component.

14. The apparatus according to claim 9, wherein the processor is further configured to obtain the power values for each of the two order components based on at least a predefined multiple-delay channel length, a channel estimation value for each of the two order components, a channel estimation value for each of a plurality of delays, or a channel estimation value for each of a plurality of taps.

15. The apparatus according to claim 9, wherein the processor is further configured to perform the SIC based on channel coefficients estimated up to the specific order.

16. The apparatus according to claim 11, wherein the processor is further configured to perform the SIC based on channel coefficients estimated up to the increased order.

* * * * *